United States Patent
Yu et al.

(10) Patent No.: US 9,344,443 B1
(45) Date of Patent: *May 17, 2016

(54) FINDING COMMAND AND CONTROL CENTER COMPUTERS BY COMMUNICATION LINK TRACKING

(71) Applicant: Pivotal Software, Inc., Palo Alto, CA (US)

(72) Inventors: Jin Yu, Melbourne (AU); Derek Lin, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,750

(22) Filed: May 5, 2015

Related U.S. Application Data (63) Continuation of application No. 14/173,544, filed on Feb. 5, 2014, now Pat. No. 9,060,018.

(51) Int. Cl.
*G06F 21/00* (2013.01)
*H04L 29/06* (2006.01)
*H04L 29/08* (2006.01)
*G06F 17/30* (2006.01)

(52) U.S. Cl.
CPC ...... *H04L 63/1425* (2013.01); *G06F 17/30327* (2013.01); *H04L 63/1441* (2013.01); *H04L 67/10* (2013.01); *H04L 67/303* (2013.01)

(58) Field of Classification Search
CPC .................................................. H04L 63/102
See application file for complete search history.

(56) References Cited

U.S. PATENT DOCUMENTS

| | | | |
|---|---|---|---|
| 8,843,997 B1* | 9/2014 | Hare | H04L 63/0281 709/200 |
| 2011/0055210 A1* | 3/2011 | Meredith | G06F 17/30601 707/737 |
| 2011/0088078 A1* | 4/2011 | Kholaif | H04W 12/06 726/3 |
| 2012/0216259 A1* | 8/2012 | Okamoto | H04L 12/4641 726/4 |
| 2014/0108562 A1* | 4/2014 | Panzer | G06Q 10/10 709/206 |
| 2014/0230066 A1* | 8/2014 | Hurwitz | H04L 63/102 726/26 |
| 2014/0282822 A1* | 9/2014 | Dunne | H04L 63/20 726/1 |
| 2014/0282845 A1* | 9/2014 | Dunne | H04L 63/20 726/1 |

* cited by examiner

*Primary Examiner* — Morshed Mehedi
(74) *Attorney, Agent, or Firm* — Fish & Richardson P.C.

(57) ABSTRACT

Methods, systems, and apparatus, including computer programs encoded on computer storage media for identifying malware attacks collects data traffic information. A system receives data traffic information indicative of communications between computers within a network and computers external to the network. The system parses the data traffic information to identify communication links between the computers within the network and computers external to the network. The system can generate communication link profiles for each of the computers within the network. The system can then group computers within the network into computer clusters based on similarities between the communication link profiles for each computer. The system can identify computer clusters having anomalous communication patterns as being indicative of a malware attack.

21 Claims, 6 Drawing Sheets

FINDING COMMAND AND CONTROL CENTER COMPUTERS BY COMMUNICATION LINK TRACKING

CROSS-REFERENCE TO RELATED APPLICATION

This application is a continuation of and claims priority to U.S. Pat. No. 9,060,018 Application Ser. No. 14/173,544), filed Feb. 5, 2014, titled "Finding Command and Control Center Computers by Communication Link Tracking", the entire contents of which are hereby incorporated by reference.

BACKGROUND

This specification relates to malware attack detection.

Malicious software or malwares are capable of infecting enterprise devices and establishing connections to external hosts that are under control of adversarial entities. These external hosts are sometimes referred to as command and control centers. Command and control centers are capable of instructing malware infected computers to perform various activities including disrupting network activity, sending information stored on the infected computers to third parties without user knowledge, and observing user interactions with the infected computers. In some cases, the location of command and control center computers can be difficult to identify. Additionally, identifying ongoing malware attacks is often difficult.

SUMMARY

A command and control center computer identification system receives data traffic information indicative of communications between computers within a network and computers external to the network. The system parses the data traffic information to identify communication links between the computers within the network and computers external to the network. The system can generate communication link profiles for each of the computers within the network. The system then groups computers within the network into computer clusters based on similarities between the communication link profiles for each computer. The system can identify computer clusters having anomalous communication patterns as being under a malware attack.

Particular embodiments of the subject matter described in this specification can be implemented to realize one or more advantages. For example, the techniques described in this specification allow a computer system to identify command and control center computers by analyzing data traffic information without analyzing the content of communications.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
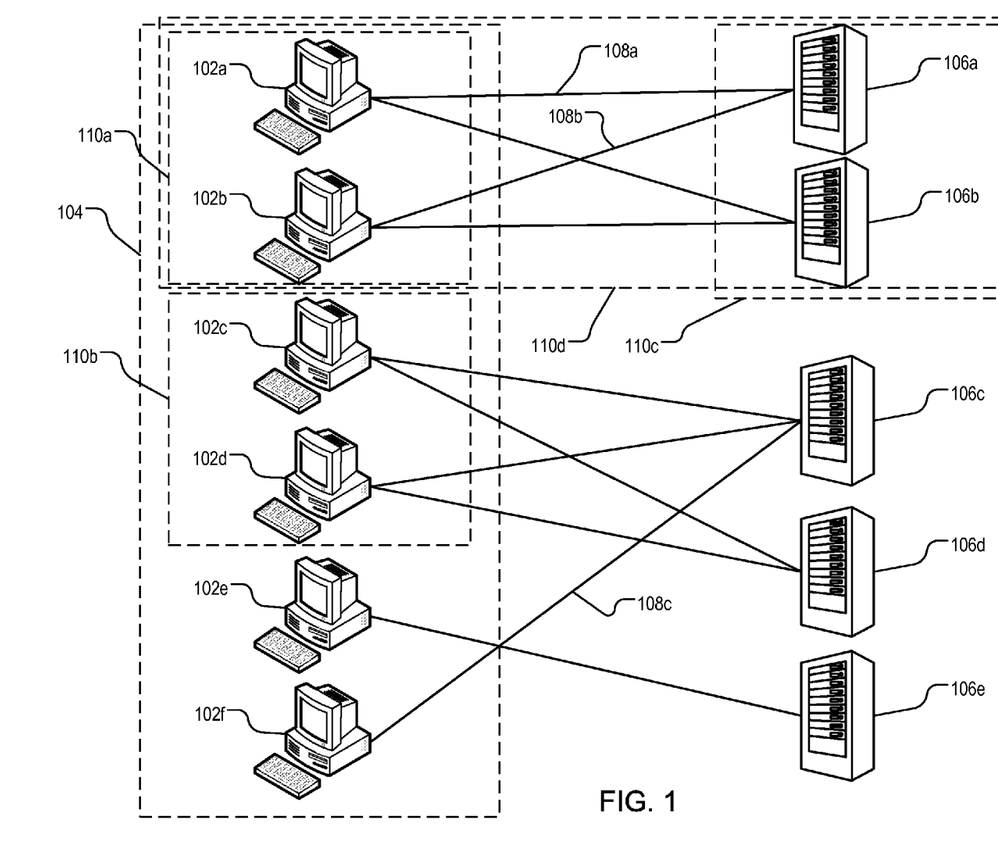
FIG. 1 is a block diagram illustrating communication link patterns between internal computers in a network and external computers outside of the network that are used to identify anomalous computer clusters.

FIG. 1 is a block diagram illustrating communication link patterns between internal computers in a network and external computers outside of the network that are used to identify anomalous computer clusters. A command and control center computer identification system determines command and control center computers behind malware attacks on internal computers $102a$-$f$. The internal computers $102a$-$f$ are located within a network 104. The network 104 can be, for example, a Local Area Network (LAN) of computers of a particular corporation. In some implementations, the internal computers $102a$-$f$ can be located behind a software or hardware based firewall. The internal computers $102a$-$f$ can be located within a single building, or on a single floor of a building. The internal computers $102a$-$f$ can be distributed among different geographic locations.

The system tracks traffic information for communications received or initiated by the internal computers $102a$-$f$ for a specified time period. For example, the system can track and store all communications initiated or received by the internal computers $102a$-$f$ for a five day period. In other examples, the system can specify longer or shorter time periods, such as 1 day, 1 hour, 10 days, or a month. The system can parse the data traffic information to identify computers that are external to the network 104 that have been in communication with one or more of the internal computers $102a$-$f$ during the specified time period. In the example shown, external computers $106a$-$e$ have been identified as having been in communication with one or more of the internal computers $102a$-$f$ during the specified time period.

In tracking the traffic information, the system can detect a communication link $108a$ through which an internal computer $102a$ has communicated with an external computer $106a$ during the specified time period, e.g., by detecting that the internal computer $102a$ has communicated with the external computer $106a$ during the specified time period. The detection of the communication link $108a$, by the system, can indicate that the internal computer $102a$ has received communications, e.g. data packets, initiated by the external computer $106a$ through a network connection, has sent communications to the external computer $106a$, or both, within the specified time period. Detection of a communication link $108b$ between an internal computer $102b$ and the external computer $106a$ indicates that the internal computer $102b$ communicated with the external computer $106a$ during the specified time period.

In some implementations, in addition to parsing data traffic information to identify the external computers $106a$-$e$ and communication links between the internal computers $102a$-$f$ and external computers 106a-e, the system also groups computers into computer clusters. The system can then analyze data traffic information for computers within each computer cluster to determine if a given computer cluster is exhibiting communication patterns indicative of a malware attack. For example, the system can identify clusters having a small number of internal computers in communication with a relatively small number of external computers when compared to other clusters to identify "fast flux" behavior in which IP addresses for command and control center computers in communication with malware on infected internal computers swapped in and out for each other at a high frequency through frequent changing of DNS records. In some implementations, the system determines a threshold value to distinguish command and control center clusters from normally functioning clusters. For example, the system can identify clusters having below a threshold ratio number of computers in comparison to an average cluster size as command and control center clusters.

The system can group computers into computer clusters by, for example, first generating a communication link profile for each of the internal computers 102a-f. A communication link profile can include a list of some or all of external computers 106a-e that a particular one of the internal computers 102a-f has communicated with during the specified time period. For example, a communication profile for the internal computer 102a would indicate that the internal computer 102a communicated with the external computer 106a and the external computer 106b during the specified time period. As another example, the communication link profile for the internal computer 102d can indicate that the internal computer 102d communicated with the external computer 106c and the external computer 106d during the specified time period.

The system can group computers having similar communication link profiles into computer clusters. In some implementations, the system only groups internal computers 102a-f into computer clusters. A communication link profile for a first computer is similar to another communication link profile for a second computer if the first and second computers communicated with the same group of computers during the specified time period or the group of computers that the first computer communicated with during the specified time period substantially overlaps with the group of computers that the second computer communicated with during the specified time period e.g., when the first group contains 90% of the same computers as the second group. For example, as shown in FIG. 1, the system determines that the internal computers 102a and 102b both communicated with the external computers 106a and 106b and no other external computers during the specified time period. The internal computers 102a and 102b therefore have identical communication link profiles and can be grouped into a computer cluster 110a by a computer clustering system. As another example, the system determines that internal computers 102c and 102d both communicated with the external computers 106c and 106d and no other external computers during the specified time period. The internal computers 102c and 102d therefore have identical communication link profiles and can be grouped into a computer cluster 110b by a computer clustering system.

In some implementations, the system clusters the internal computers 102a-f such that each internal computer within a computer cluster has an identical communication link profile as every other computer within the cluster. In some implementations, the system can set a threshold to identify a level of similarity for communication link profiles when grouping computers into clusters. For example, the system can set a threshold of N to indicate that computers having communication link profiles that differ by no more than N communication links are grouped into the same computer cluster while computers having communication link profiles that differ by more than N communication links are placed in different computer clusters. For example, the system detects a communication link 108c indicating that the internal computer 102f communicated with the external computer 106c during the specified time period. If the system sets the threshold N to 1, the system can group the internal computer 102f into the same cluster with the internal computers 102c and 102d since the communication link profile of the internal computer 102f differs from each of the communication link profiles of the internal computers 102c and 102d by only one communication link. Under this scenario, all three of the internal computers 102c, 102d and 102f communicate with the external computer 106c, so the only difference between the communication link profile of the internal computer 102f and the communication link profiles of the internal computers 102c and 102d is that the internal computer 102f did not communicate with the external computer 106d during the specified time period. Since there is only one communication link difference between the communication link profiles of internal computers 102c and 102d and the internal computer 102f, the system groups the internal computers 102c, 102d and 102f into the same computer cluster.

In practice, internal computer networks will often include a much larger number of internal computers than shown in the example in FIG. 1. Additionally, the computers within a network will often communicate with a much larger number of external computers than shown in the example in FIG. 1. In such scenarios, it may be advantageous to use a higher threshold when grouping computers into computer clusters based on similarities in communication link profiles. For example, a threshold of 10 or 20 may be more appropriate for a network having 200 internal computers in communication with several thousand external computers.

In some implementations, the system only groups external computers 106a-e into computer clusters. For example, the system can create a communication link profile for each of the external computers 106a-e. In the example shown, the system can generate a communication link profile for the external computer 106a to indicate that the external computer 106a communicated with the internal computer 102a and the internal computer 102b and no other internal computers during the specified time period. Since the external computer 106b also communicated with the internal computer 102a and the internal computer 102b and no other internal computers during the specified time period, the communication link profile for the external computer 106b is the same as the communication link profile for the external computer 106a. The system can therefore group the external computers 106a and 106b into a computer cluster 110c since they have identical communication link profiles.

In some implementations, the system can create computer clusters that include both internal computers and external computers. For example, the system can group the internal computers 102a and 102b into a computer cluster 110d with the external computers 106a and 106b upon determining, in the example shown, that the internal computers 102a and 102b exclusively communicated with the external computers 106a and 106b during the specified time period. As another example, the system can identify a computer cluster that includes the internal computers 102c and 102d, the external computers 106c and 106d, and possibly the internal computer 102f, depending on a threshold level for determining computer clusters.

In some scenarios, one or more of the internal computers 102a-f are infected with malicious software, also known as malware, and one or more of the external computers 106a-e acts as a command and control center in communication with the malware on the one or more infected internal computers. In some scenarios, a command and control center computer can instruct malware on an infected internal computer to perform various activities within a network, for example, to hamper network communication, to disable or hamper performance of an infected computer, or to steal information, e.g., intellectual property, banking information, or payroll information, from an infected computer. In some scenarios, multiple command and control center computers can be in communication with a single infected internal computer. In some scenarios, malware on an infected internal computer can randomly select a subset of command and control center computers from a large number of command and control center computers with which to communicate.

In some implementations, a system can analyze communication patterns for computers within each identified computer cluster to determine if communication patterns associated with a given computer cluster are indicative of a malware attack. For example, the system can analyze communication link profiles of computers within each identified computer cluster to determine if the communication link profiles of computers within a computer cluster are indicative of a malware attack. For example, communication link profiles for computers within a computer cluster can be analyzed to identify "fast flux" behavior by the internal computers in the computer cluster that is indicative of a malware attack. In some cases, infected internal computers, e.g., malware-infected unmanaged devices, will communicate with a subset of external computers that is significantly lower in number than a number of external computers with which a non-infected computer, e.g., an end-user computer, communicates during the same time period. In other cases, cadence of timing and periodicity information of communications of computers within a computer cluster can be analyzed for malware attack indication.

In some implementations, if the system identifies a computer cluster as including computers having communication link profiles indicative of a malware attack, the system can identify the internal computers within the computer cluster as infected computers, and one or more external computers with which the infected internal computers communicated during the specified time period as command and control center computers. In some implementations, once the system identifies a particular external computer as a command and control center computer, the system can block communication between the internal computers to the identified command and control center computer. For example, a firewall implemented by the network 104 can prevent communications from the command and control center computer to any of the internal computers 102a-f and communications to the command and control center computer by any of the internal computers 102a-f.

In some implementations, upon determining that computers within a computer cluster communicate with a set of external computers at a frequency that varies from an average frequency of communication between non-infected internal computers and other external computers by more than a threshold value, the system can identify the computer cluster as having communication patterns indicative of a malware attack. For example, the system can analyze communication link profiles for computers within a computer cluster to identify "fast flux" behavior by the internal computers in the computer cluster that is indicative of a malware attack. In some cases, infected internal computers will communicate with a subset of external computers that is significantly lower in number than a number of external computers with which a non-infected computer communicates during the same time period. For example, if an average non-infected computer communicates with 30 external computers for a given time period, the system may identify a computer that communicates with four external computers during the same time period as an infected computer. In other cases, infected computers will communicate regularly at a fixed time interval to external computers. For example, if a computer communicates with external computers every one minute, the system may identify such a computer as an infected computer.

In some implementations, a computer system can access a list of previously identified command and control center computers. For example, the system can access stored IP addresses or other identifiers for external computers that have previously been identified as being associated with malware attacks. The system can compare identifiers for the external computers 106a-e to the list of previously identified command and control center computers to determine if one or more of the external computers 106a-e are command and control center computers. If the system identifies any one of the external computers 106a-e as a command and control center computer using the list of previously identified command and control center computers, the system can also determine that some or all external computers associated with the same cluster as the identified external computer are command and control center computers.

For example, the system can compare IP addresses of the external computers 106a-e to the list of previously identified command and control center computers. If the IP address of the external computer 106a matches an IP address stored on the list, the system identifies the external computer 106a as a command and control center computer and communication between the internal computers 102a-f and the external computer 106a is blocked. Additionally, the system can identify a computer cluster that includes the external computer 106a, as described above. For example, the system can define a cluster that includes the external computers 106a and 106b. Since the IP address of the external computer 106a is on the list of previously identified command and control center computers, the system can determine that the external computer 106b is a command and control center computer since the external computer 106b is in the same computer cluster as the external computer 106a. In response to this determination that the external computer 106b is likely to be a command and control center computer, the system can block communications between the internal computers 102a-f and the external computer 106b.

In some implementations, as will be discussed in greater detail with reference to FIG. 2, communication link profiles for the internal computers 102a-f can be stored in matrix form. For example, the system can create a matrix in which each row in the matrix represents one of the internal computers 102a-f and each column in the matrix represents one of the external computers 106a-e. The system can assign a first value, e.g., "1", for a particular element of the matrix to indicate that the internal computer represented by the row of that element communicated with the external computer represented by the column of that element during the specified time period. For example, an element at the intersection of the row representing the internal computer 102e and the column representing the external computer 106e would have a value of "1" to indicate that the internal computer 102e communicated with the external computer 106e during the specified time period. The system can assign a second value, e.g., "0", for a particular element of the matrix to indicate that the internal computer represented by the row of that element did not communicate with the external computer represented by the column of that element during the specified time period. For example, an element at the intersection of the row representing the internal computer 102e and the column representing the external computer 106b would have a value of "0" to indicate that the internal computer 102e did not communicate with the external computer 106b during the specified time period. In some implementations, data structures other than matrices can be used to store communication link profiles.

Figure 2:
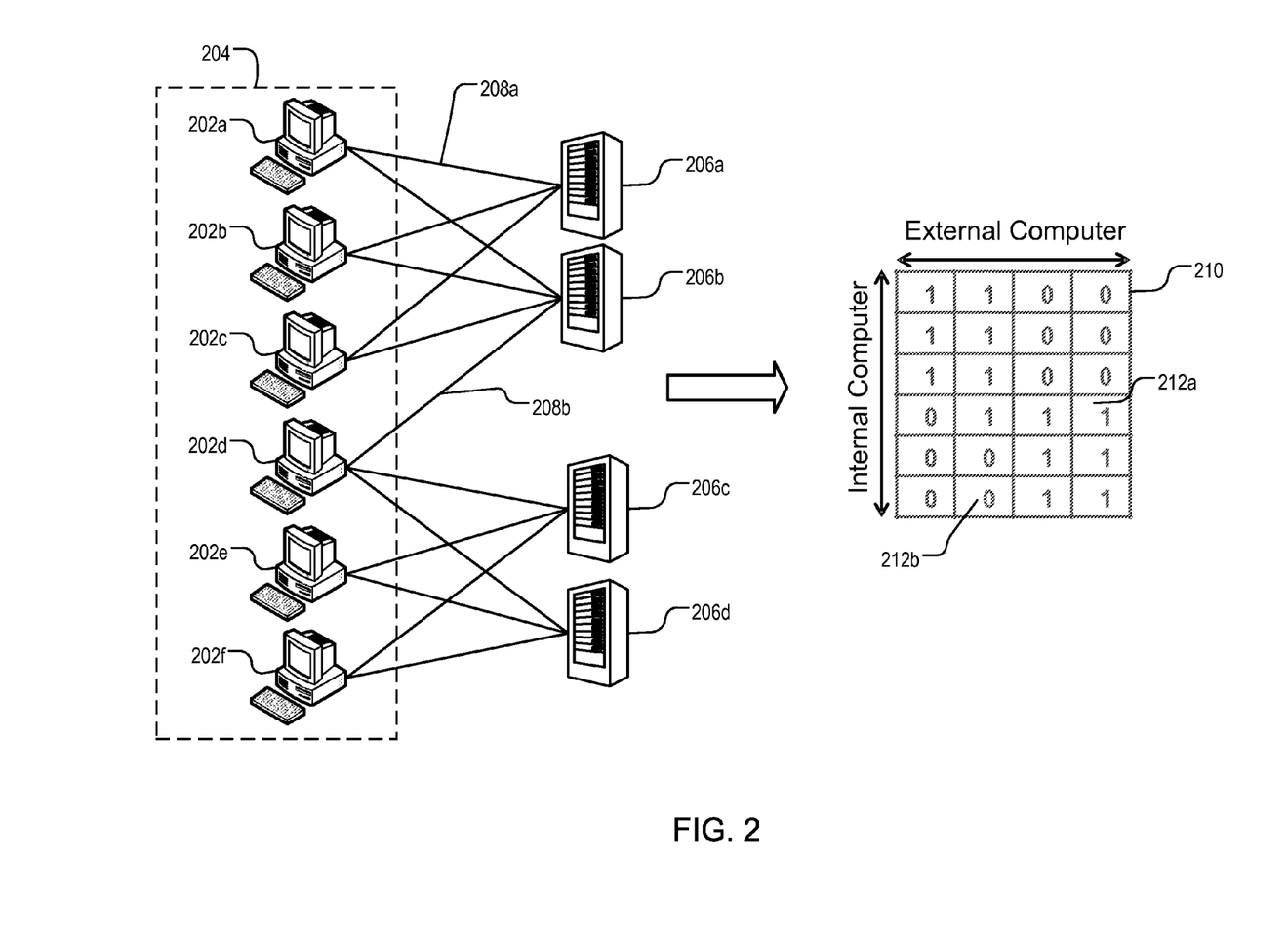
FIG. 2 illustrates communication links between internal computers in a network and external computers and a communication matrix indicative of the communication links.

FIG. 2 illustrates communication links between internal computers in a network and external computers and a communication matrix indicative of the communication links. FIG. 2 shows a set of internal computers 202a-f within a network 204. The network 204 can be, for example, a LAN of computers. In some scenarios, the internal computers 202a-f can be located behind a software or hardware based firewall. In some scenarios, the internal computers 202a-f can be located within a single building, or on a single floor of a building. In some scenarios, the internal computers 202a-f can be distributed among different geographic locations.

The internal computers 202a-f are in communication with a set of external computers 206a-d. A command and control center computer identification system can detect communication links indicating communications over a specified time period, e.g., five days, between the internal computers 202a-f and the external computers 206a-d. For example, the system detects a communication link 208a indicating that the internal computer 202a has received data packets from or transmitted data packets to the external computer 206a during the specified time period. As another example, the system detects a communication link 208b indicating that the internal computer 202d communicated with the external computer 206b during the specified time period.

The communications that occur between the internal computers 202a-f and the external computers 206a-d during the specified time period can be represented by a communication matrix 210. The communication matrix can be generated, for example, by a command and control center computer identification system. Each row of the communication matrix 210 represents one of the internal computers 202a-f and each column of the communication matrix 210 represents one of the external computers 206a-d. For example, the first row of the communication matrix 210 represents the internal computer 202a and the third column of the communication matrix 210 represents the external computer 206c. In the example shown, the communication matrix 210 is a 6 by 4 matrix since the communication matrix 210 is representative of communications between the six internal computers 202a-f and the four external computers 206a-d. As another example, communications between a network that includes 250 internal computers in communication with 10,000 external computers for a given time period can be represented by a 250 by 10,000 matrix. In some implementations, communications between internal and external computers is represented by a matrix having hundreds of thousands of rows and hundreds of thousands of columns.

Each element of the communication matrix 210 indicates whether or not communication has occurred between the internal computer represented by the row of the element and the external computer represented by the column of the element. For example, an element 212a indicates whether or not communication between the internal computer 202d and the external computer 206d has occurred during the specified time period. In the example shown, the communication matrix 210 is a binary matrix, where each element of the communication matrix 210 has one of two possible values. In this case, the possible values for each element are "0" and "1." Each element of the communication matrix 210 has a value of "1" if communication between the internal computer and the external computer represented by the element occurred during the specified time period. Each element of the communication matrix 210 has a value of "0" if no communication occurred between the internal computer and the external computer represented by the element during the specified time period. For example, the element 212a at the fourth row and fourth column of the matrix 210 has a value of "1" to indicate that communication occurred between a fourth internal computer, the internal computer 202d, and a fourth external computer, the external computer 206d, during the specified time period. As another example, the element 212b at the sixth row and second column of the matrix 210 has a value of "0" to indicate that no communication occurred between a sixth internal computer, the internal computer 202f, and a second external computer, the external computer 206b, during the specified time period.

In some implementations, the communication matrix 210 can be a non-binary matrix. Each element of the communication matrix 210 can have a value that is indicative of the amount of data traffic between the internal computer represented by the row of the element and the external computer represented by the column of the element for a specified time period. For example a value of an element can indicate that 50 megabytes of data were exchanged between a given internal computer and an external computer during the specified time period. In some implementations, including values indicative of an amount of data traffic for each element of the communication matrix 210 can help to better identify communication patterns associated with malware attacks as well command and control center computers than would having only binary values for the communication matrix 210.

In some implementations, the communication matrix 210 only maintains the statistics of communication events, such as amount of traffic or number of communications, on a subset of possible computer event types. For example, the communication matrix only maintains the statistics for only communications occurring over DNS port 53, instead of all possible ports.

Figure 3A:
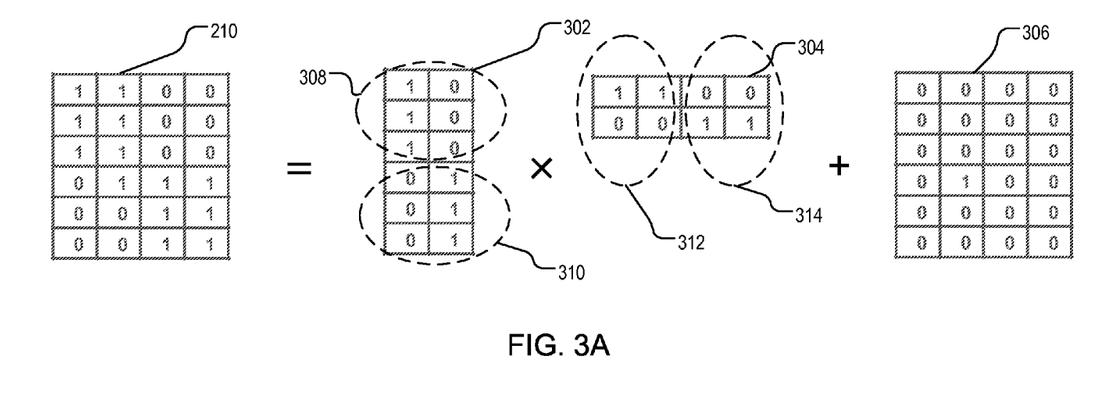
FIG. 3A illustrates matrix factorization techniques of dividing the communication matrix of FIG. 2 into component matrices.

FIG. 3A illustrates matrix factorization techniques of dividing the communication matrix of FIG. 2 into component matrices. A system can factorize the communication matrix 210 into a first component matrix 302 and a second component matrix 304. The system can approximate the communication matrix 210 by multiplying the first component matrix 302 by the second component matrix 304. A remainder matrix 306 can also be calculated if needed. Factorizing the communication matrix 210 into smaller component matrices allows the system to store the communication matrix 210 on a hard drive or in memory in a format that takes up less space than if the communication matrix 210 were stored in a non-factorized format. Factorization can also allow the system to more readily manipulate and analyze the information contained in the communication matrix 210 when the system is executing processes such as computer clustering and command and control center computer identification. These benefits can become increasingly important for large communication matrices (e.g., matrices having hundreds of thousands of rows and columns).

In the example shown, the communication matrix 210 is factorized by the system into the 6 by 2 first component matrix 302, the 2 by 4 second component matrix 304 and the 6 by 4 remainder matrix 306 to provide a condensed summary of the information stored in the communication matrix 210. In some implementations, the system uses non-negative matrix factorization to create the matrices 302 and 304 from the communication matrix 210. In non-negative matrix factorization, values stored by the matrices 302 and 304 are non-negative values.

Figure 3B:
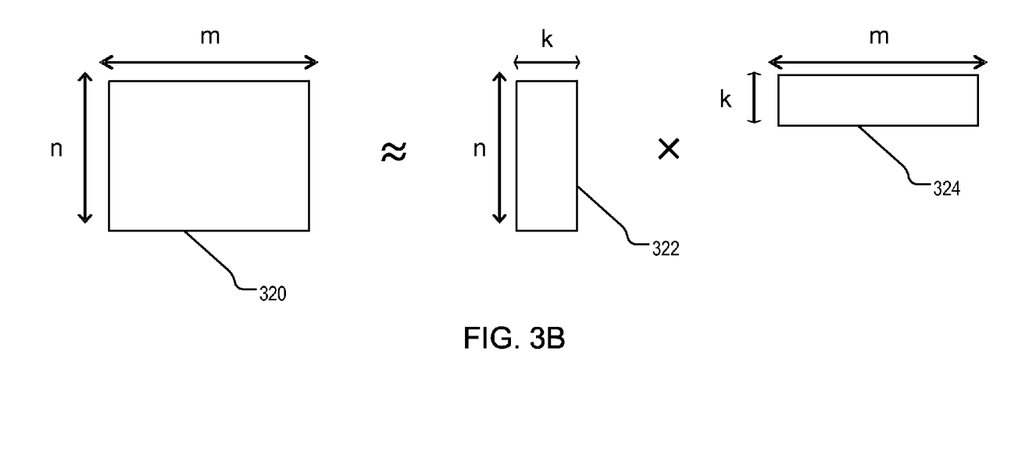
FIG. 3B illustrates component matrices of an n by m matrix derived through matrix factorization.

FIG. 3B illustrates component matrices of an n by m matrix derived through matrix factorization. FIG. 3B shows another example of a communication matrix 320 that has been factorized into a matrix 322 and a matrix 324. A remainder matrix for the matrix factorization of the communication matrix 320 is not shown, although in some implementations, the system can use a remainder matrix to accurately recreate the communication matrix 320 using the matrix 322 and the matrix 324. The communication matrix 320 represents communications between n number of internal computers that are internal to a computer network and m number of external computers in communication with the internal computers. For example, n can be on the order of 200,000 and m can be on the order of 300,000. The system can factorize the communication matrix 320 into the matrix 322 having n number of rows and k number of columns (an n by k matrix) and the matrix 324 having k number of rows and m number of columns (a k by m matrix). The number of columns of the matrix 322 (k) is the same as the number of rows as the matrix 324 (k).

The system can use various techniques to factorize the communication matrix 320 into the matrices 322 and 324. For example, the system can use Alternating Least Squares (ALS) factorization to generate the matrices 322 and 324 from the communication matrix 320. To factorize the communication matrix 320 using ALS factorization, the system starts with random values for the elements of the matrix 322. In some implementations, the random values for the initial values of columns in matrix 322 can be obtained by averaging a number of randomly selected columns from the communication matrix 320. With the values of the communication matrix 320 and the matrix 322 set, the system solves for the minimum value of the squared Frobenius norm of communication matrix 320 minus the product of the matrix 322 and the matrix 324, for the value of matrix 324. For example, if A represents communication matrix 320, F represents the matrix 322 and G represents the matrix 324, the system solves the following function for G:

$$\min \|A - FG\|_F^2,$$

where $\|\cdot\|_F$ denotes the Frobenius norm of a matrix.

The system then sets all negative values in the matrix 324 (or "G" matrix) to zero. Now, with G set at this newly derived value, the system solves the following function for F:

$$\min \|A - FG\|_F^2$$

The system then sets all negative values in the matrix 322 (or "F" matrix) to zero. The system then repeats the above steps (solve for G, convert negative values to zero, solve for F, convert negative values to zero) until the results for F and G converge to within a pre-determined convergence criterion.

In some implementations, the system can utilize any factorization method suitable for factorizing large order matrices to factorize the communication matrix 320. For example, Stochastic Gradient Descent, Eigenvalue Decomposition, or Nuclear Norm Minimization can be used.

In FIG. 3A, the first component matrix 302 summarizes communication patterns for the internal computers 202a-f (of FIG. 2), with each of the internal computers 202a-f represented by a row of the first component matrix 302. The second component matrix 304 summarizes communication patterns for the external computers 206a-d, with each of the external computers 206a-d represented by a column of the second component matrix 304.

A computer clustering system can analyze the first component matrix 302 to group the internal computers 202a-f into computer clusters based on similarities for the values of elements in each row of the first component matrix 302. In the example shown, the first three rows of the first component matrix 302 (representing the internal computers 202a-c) are grouped by the system into a cluster 308 since the first three rows of the first component matrix 302 have identical horizontal values. Similarly, the last three rows of the first component matrix 302 (representing the internal computers 202d-f) are grouped by the system into a cluster 310 because the last three rows of the first component matrix 302 have identical horizontal values.

In some implementations, the system can set a threshold similarity value such that identical values are not required to group two or more rows each representing a different internal computer into a computer cluster. For example, looking at FIG. 3B, the matrix 322 can have 300 columns (k=300), and the system can set a threshold of 5, such that the system groups rows having five or less dissimilar element values into the same computer cluster.

Returning to FIG. 3A, the computer clustering computer system can analyze the second component matrix 304 to group the external computers 206a-d into computer clusters based on similarities for the values of elements in each column of the second component matrix 304. In the example shown, the first two columns of the second component matrix 304 (representing the external computers 206a-b) are grouped into a cluster 312 by the system since the first two columns of the second component matrix 304 have identical vertical values. Similarly, the last two columns of the second component matrix 304 (representing the external computers 206c-d) are grouped by the system into a cluster 314 since the last two columns of the second component matrix 304 have identical vertical values.

In some implementations, the system can set a threshold similarity value for use by the system in grouping two or more columns having non-identical values (representing two or more external computers having non-identical communication link patterns) into a computer cluster. For example, looking at FIG. 3B, the matrix 324 can have 300 rows (k=300), and the system can set a threshold of 5, such that the system groups columns having five or less dissimilar element values into the same computer cluster.

In some implementations, the system can use an agglomerative hierarchical clustering approach to cluster internal computers, external computers, or both into computer clusters. For example, the system can use hierarchical clustering to organize data into a tree structure represented by a dendrogram, with each "leaf" of the tree structure representing a data point (e.g., a computer to be clustered) and each interior node representing a cluster. The system can then use the agglomerative hierarchical clustering algorithm to build clustering trees from the bottom up by merging closest clusters within the tree structure. The system can select a specified "height" along the tree structure in order to identify clusters. Selecting different values for a height along the tree structure to identify clusters will yield different numbers of clusters. For example, if the system selects a relatively low specified height value, more clusters will be identified by the system than if the system selects a relatively high specified height value.

In some implementations, the system can use an agglomerative hierarchical clustering approach such as a minimax linkage clustering method to group internal computers or external computers into computer clusters. Implementation of minimax linkage clustering by the system can include operations by the system to map the data stored in a component matrix produced by matrix factorization into multiple dimensions. For example, as described above, each row of the component matrix 302 represents one of the internal computers. The system can represent each row of the matrix 302 as a data point on a multi-dimensional coordinate. In this example, the component matrix 302 has two columns, therefore that the system represents each row of the matrix 302 as a two-dimensional data point, with the first column mapped along an X dimension and the second column mapped along a Y dimension of a two-dimensional coordinate.

The system can identify computer clusters by grouping data points having a close proximity to one another. Each data point represents an internal computer. In some implementations, the system can use a threshold to define the size of clusters. For example, the system can set a cluster radius to a threshold value of 1.5, such that each data point within a cluster is within a distance of 1.5 of all other data points in the cluster. In some implementations, the system can group clusters recursively. For example, the system can identify clusters having a small number of data points, and then group these small clusters into larger clusters based on proximity of the clusters within the multi-dimensional coordinate graph until clusters having a desired number of data points or a number of data points within a desired range are identified. For example, the system can perform an initial clustering step of identifying data points having identical values as clusters. The system then creates larger clusters by combining smaller clusters until clusters of a desired size, meeting a specified size threshold, or within a desired size range are identified.

In some implementations, the system identifies a representative data point for each cluster. The representative data point can be designated as a prototype data point. In some implementations, the system designates as the prototype data point a data point that is best representative of the values of all data points within a cluster. In some implementations, the system determines the prototype data point by drawing a radius from each data point within a cluster such that the radius drawn from a given data point encircles all other data points of the cluster. The system identifies the data point having the smallest radius as the prototype data point. In some implementations, the system identifies the prototype data point by first determining a sum of the total distances between each particular data point and all other data points in a cluster. The system identifies the prototype data as the data point having a shortest total distance between itself and all other data points of the cluster.

In some implementations, the system determines distances between clusters. In some implementations, the system identifies the distance between two clusters as the distance between the prototype data points of each cluster. In some implementations, such as minimax linkage clustering implementations, the system identifies the distance between two clusters as the smallest radius that can encompass all points of two clusters. Other techniques for determining a distance between two clusters can also be used, such as, for example, complete linkage clustering or centroid linkage clustering. Once distances between clusters have been identified, the system can create larger clusters from smaller clusters by grouping clusters that are closest in distance to each other. The system can form larger clusters from smaller clusters in an iterative process until clusters having a desired number of data points, or a number of data points within a desired range are identified. In some implementations, the system forms larger clusters from smaller clusters in an iterative process until a maximum cluster radius threshold is reached for each identified cluster.

In some implementations in which a communication matrix has a large number of data points the system may perform other data manipulation on the data points prior to clustering in order to make the data more manageable. For example, the system can plot data points derived from a component matrix, e.g. the component matrix 302, in multiple dimensions and then organize the data points into a k-dimensional ("K-D") tree in order to identify data point neighbors. To construct a K-D tree, the system can take multi-dimensional data points, select a dimension, and then identify a median value for the data points along that dimension. The system can split the data points by the median value and arrange the data points into two sub-trees. The system can then select a second dimension, and identify the median value in that dimension for the data points in each sub-tree in order to further divide the data points. The system can repeat this iterative process for each dimension of the multi-dimensional coordinate space to create a K-D tree with a desired size of sub-trees. For example, the system can construct a K-D tree such that each of its sub-trees contains no more than 1000 data points. Having constructed a K-D tree, the system can perform clustering on each sub-tree of data points independently.

Once the system has grouped computers (internal computers, external computers, or both) into clusters, the system can analyze communication patterns associated with the computers in each cluster to determine if any of the communication patterns are indicative of a malware attack. For example, the system can flag clusters having a small number of internal computers that communicate with a relatively small number of external computers in comparison to other clusters as potential command and control center clusters. The system can identify clusters having a small number of internal computers in communication with a relatively small number of external computers when compared to other clusters to identify "fast flux" behavior in which IP addresses for command and control center computers in communication with malware on infected internal computers are swapped in and out for each other at a high frequency through frequent changing of DNS records. In some implementations, the system determines a threshold value to distinguish command and control center clusters from normally functioning clusters. For example, the system can identify an average cluster size, i.e., an average number of internal computers for each cluster. The system can identify clusters having below a threshold ratio number of computers in comparison to the average cluster size as command and control center clusters.

In some implementations, the system identifies the external computers included within each flagged cluster (or external computers in communication with internal computers in each flagged cluster) as command and control center computers. The system can add identifiers, e.g., IP addresses, or network addresses, of the identified command and control center computers to a list of identified command and control center computers and store the list in memory. The system can prohibit communications between internal computers and the identified command and control center computers, e.g., through use of firewall software.

Figure 4:
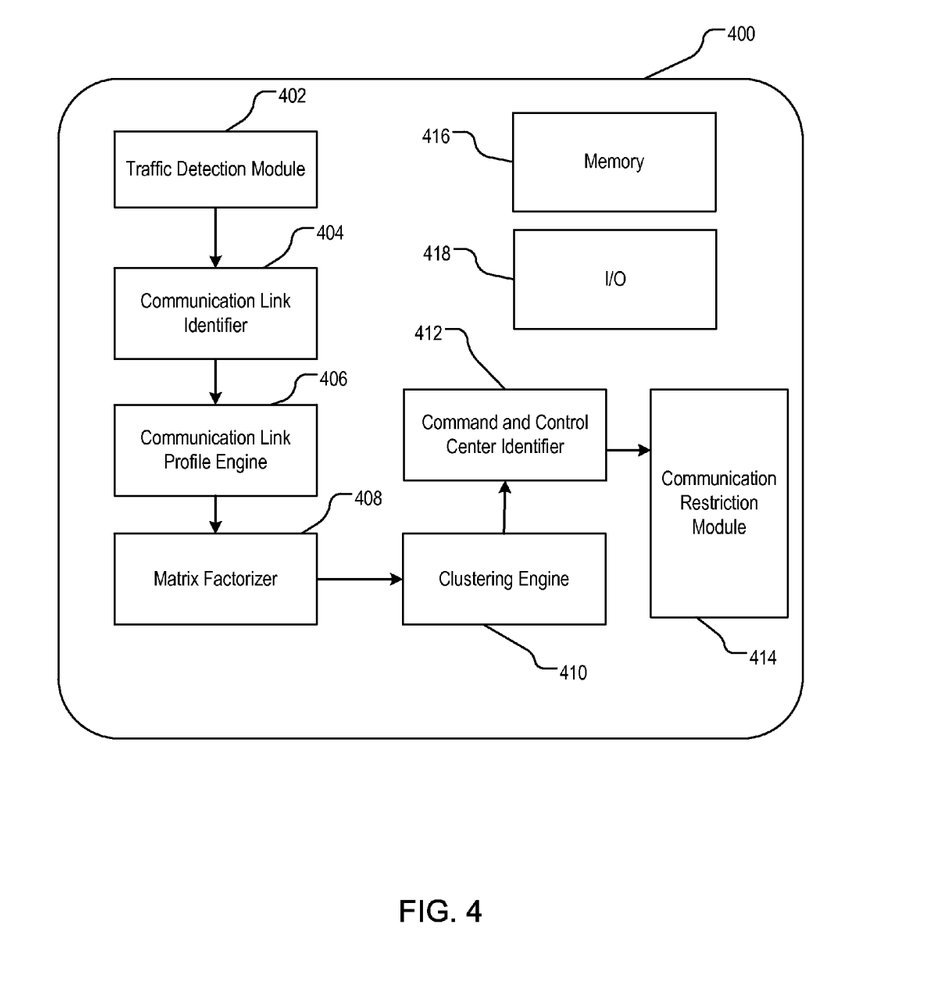
FIG. 4 is a block diagram of an example system for identifying command and control center systems.

FIG. 4 is a block diagram of an example system 400 for identifying command and control center systems. The system 400 can be implemented on one or more computers or distributed throughout one or more networks. The system 400 includes a traffic detection module 402 for determining data traffic information for a set of internal computers within a computer network. The traffic detection module 402 can, for example, use one or more input/output ports 418 to receive data traffic information from the internal computers and then compile the received data traffic information. In some implementations, the traffic detection module 402 can identify data packets being received or transmitted by internal computers within the computer network as well as associated data such as originating and destination computers for the data packets and packet transmittal time. The traffic detection module 402 can also identify computers that are external to the computer network that are in communication with the internal computers. IP addresses or other identifiers for the identified external computers can be stored in, for example, a memory 416.

The system 400 includes a communication link identifier 404 for identifying communication links between the internal computers and the external computers. The communication link identifier 404 can parse through the data traffic information collected by the traffic detection module 402 to identify communication links. Each communication link can indicate an internal computer and an external computer that communicated with each other during a specified time period. The system 400 further includes a communication link profile engine 406 configured to create a communication link profile for each internal computer, each external computer or both. For example, the communication link profile engine 406 can create a communication link profile for each internal computer within the computer network. For example, the communication link profile engine 406 can be associated with the network 204 of FIG. 2. The communication link profile engine 406 can create the communication matrix 210, where each row of the communication matrix 210 serves as a communication profile for one of the internal computers 202a-f respectively. The communication link profile engine 406 can store communication link profiles for each internal computer (or each external computer, or both) in, for example, the memory 416.

The system 400 includes a matrix factorizer 408. The matrix factorizer 408 can factorize a matrix created by the communication link profile engine 406 into smaller, low-rank, component matrices. For example, the matrix factorizer 408 can factorize the communication matrix 210 of FIG. 3A into the matrices 302 and 304. Component matrices created by the matrix factorizer 408 can be stored in, for example, the memory 416. The system 400 includes a clustering engine 410 to identify data point clusters using the component matrices created by the matrix factorizer 408, in which each data point represents a computer. For example, the clustering engine 410 can cluster all internal computers in the computer network into computer clusters. The clustering engine 410 can employ any of the clustering techniques described above. For example, the clustering engine 410 can employ an agglomerative hierarchical clustering approach.

The system 400 includes a command and control center identifier 412 configured to identify clusters having communication patterns that are indicative of a malware attack. The command and control center identifier 412 can analyze communication patterns associated with the computers in each cluster identified by the clustering engine 410 to determine if any of the communication patterns correspond to communication patterns associated with "fast flux" type behavior, or are otherwise indicative of a malware attack. For example, the command and control center identifier 412 can identify clusters having a number of internal computers in communication with a number of external computers where the number of internal and external computers is significantly smaller than then number of internal and external computers associated with clusters exhibiting normal communication patterns. In some implementations, a threshold value is determined to distinguish command and control center clusters from normally functioning clusters. For example, an average cluster size (i.e., average number of internal computers for each cluster) can be identified. Clusters having below a threshold ratio number of computers in comparison to the average cluster size can be identified as command and control center clusters.

In some implementations, the command and control center identifier 412 can access a list of previously identified command and control center computers. For example, the list of previously identified command and control center computers can be stored in the memory 416 and accessed by the command and control center identifier 412. The list of previously identified command and control center computers can include IP addresses or other identifiers for external computers that have previously been identified as being associated with malware attacks. The command and control center identifier 412 can compare identifiers for external computers included in each computer cluster, or in communication with internal computers included within each computer cluster to the list of previously identified command and control center computers to determine if any of the external computers are command and control center computers. If the command and control center identifier 412 identifies any of the external computers as command and control center computers using the list of previously identified command and control center computers, the command and control center identifier 412 can determine that all external computers associated with the same cluster as the identified external computer are command and control center computers. The command and control center identifier 412 can add IP addresses or other identifiers for identified command and control center computers to a list of identified command and control center computers.

The system 400 includes a communication restriction module 414 for restricting communication between internal computers within the computer network and the identified command and control center computers. For example, the communication restriction module 414 can be a software and/or hardware implemented firewall. The communication restriction module 414 can access the list of identified command and control center computers created or edited by the command and control center identifier 412 and restrict all communications with the identified command and control center computers.

Figure 5:
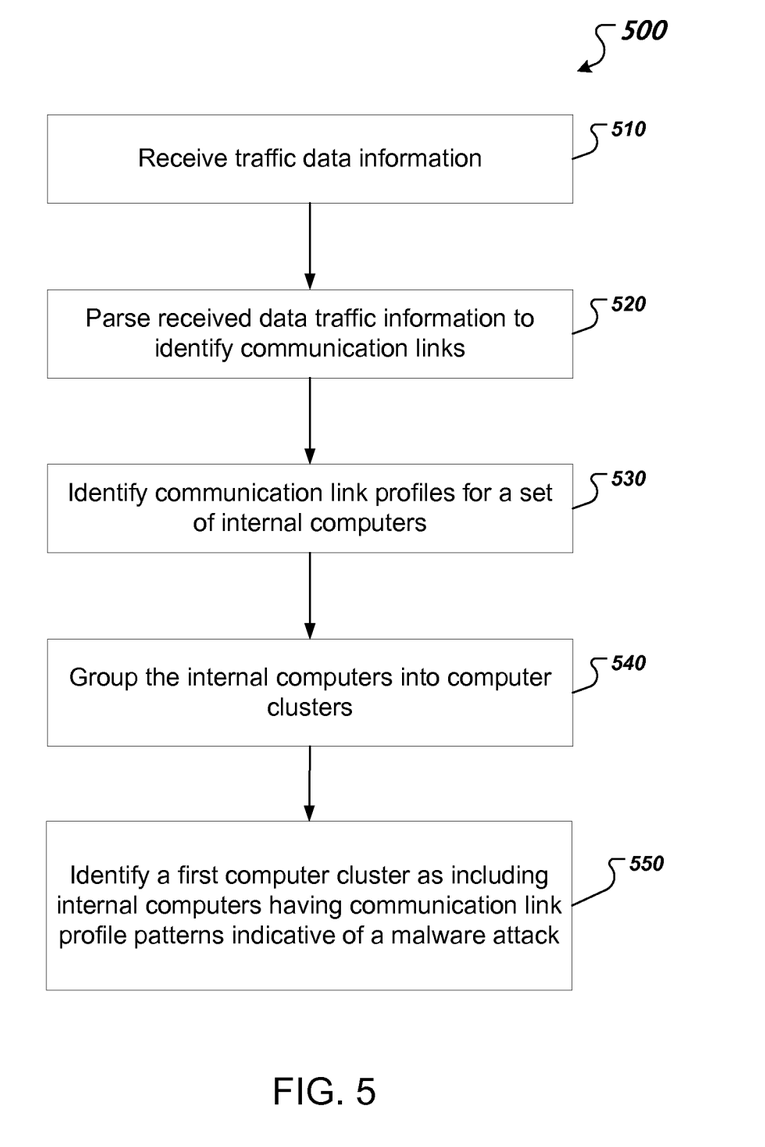
FIG. 5 is a flowchart illustrating an example process for identifying a malware attack.

FIG. 5 is a flowchart illustrating an example process 500 for identifying a malware attack. The process 500 can be performed by an example system, e.g., the system 100 of FIG. 4.

A traffic detection module of the system receives (510) data traffic information. The data traffic information can include information on communications received or transmitted by internal computers within a computer network during a specified time period. For example, the received data traffic information can include information associated with all communications transmitted or received by the internal computers over a three-day period. The data traffic information can include information on recipient computers, transmitting computers, communication transmission time, communication transmission success, and communication transmission frequency.

The system parses (520) the received data traffic information to identify communication links. Each communication link identifies a computer internal to the network and an external computer that has communicated with the internal computer (e.g., received or transmitted data packets) during the specified time period. In some implementations, the system can define each communication link as internal computer/external computer pairs.

The system identifies (530) communication link profiles for a set of internal computers. For example, the system can generate a communication link profile for each internal computer within a computer network to reflect all external computers that each internal computer has communicated with during the specified time period. In some implementations, the system can store the communication link profiles as a matrix, where each row of the matrix represents an internal computer and each column represents an external computer that has communicated with at least one of the internal computers during the specified time period. For example, the system can store the communication link profiles for the internal computers 202a-f of FIG. 2 in the form of the communication matrix 210. In this example, each row of the communication matrix 210 is a communication profile for one of the internal computers 202a-f.

The system groups (540) the internal computers into computer clusters. In some implementations, the system can group all internal computers having identical communication link profiles into clusters. In some implementations, the system can group computers having communication link profiles that differ by a threshold number of element values into clusters. For example, the system can define clusters such that each internal computer within a given computer cluster has a communication profile that differs by two or less element values from all other internal computers within the cluster. In some implementations, the system can plot data points for the internal computers in a multi-dimensional coordinate space. The multi-dimensional coordinate space can have one dimension for each element within a single communication link profile (aka, one dimension for each column of a matrix representative of the communication link profiles). The system can then identify computer clusters based on distances between data points (or between smaller clusters of data points) in the multi-dimensional coordinate space using one of the clustering techniques discussed above. In some implementations, the system can factorize a communication matrix indicative of communication link profiles into component matrices and one or more of the component matrices can be used to identify computer clusters.

The system identifies (550) a first computer cluster as including internal computers having communication link profile patterns indicative of a malware attack. For example, the system can identify clusters having a number of internal computers in communication with a number of external computers where the number of internal and external computers is significantly smaller than then number of internal and external computers associated with clusters exhibiting normal communication patterns as having a communication link profile pattern indicative of a malware attack. In some implementations, as described above, the system can use a list of previously identified command and control center computers to identify the first computer cluster as including internal computers having communication link profile patterns indicative of a malware attack. In some implementations, the system can restrict communications between the internal computers within the computer network and external computers identified as command and control center computers.

Figure 6:
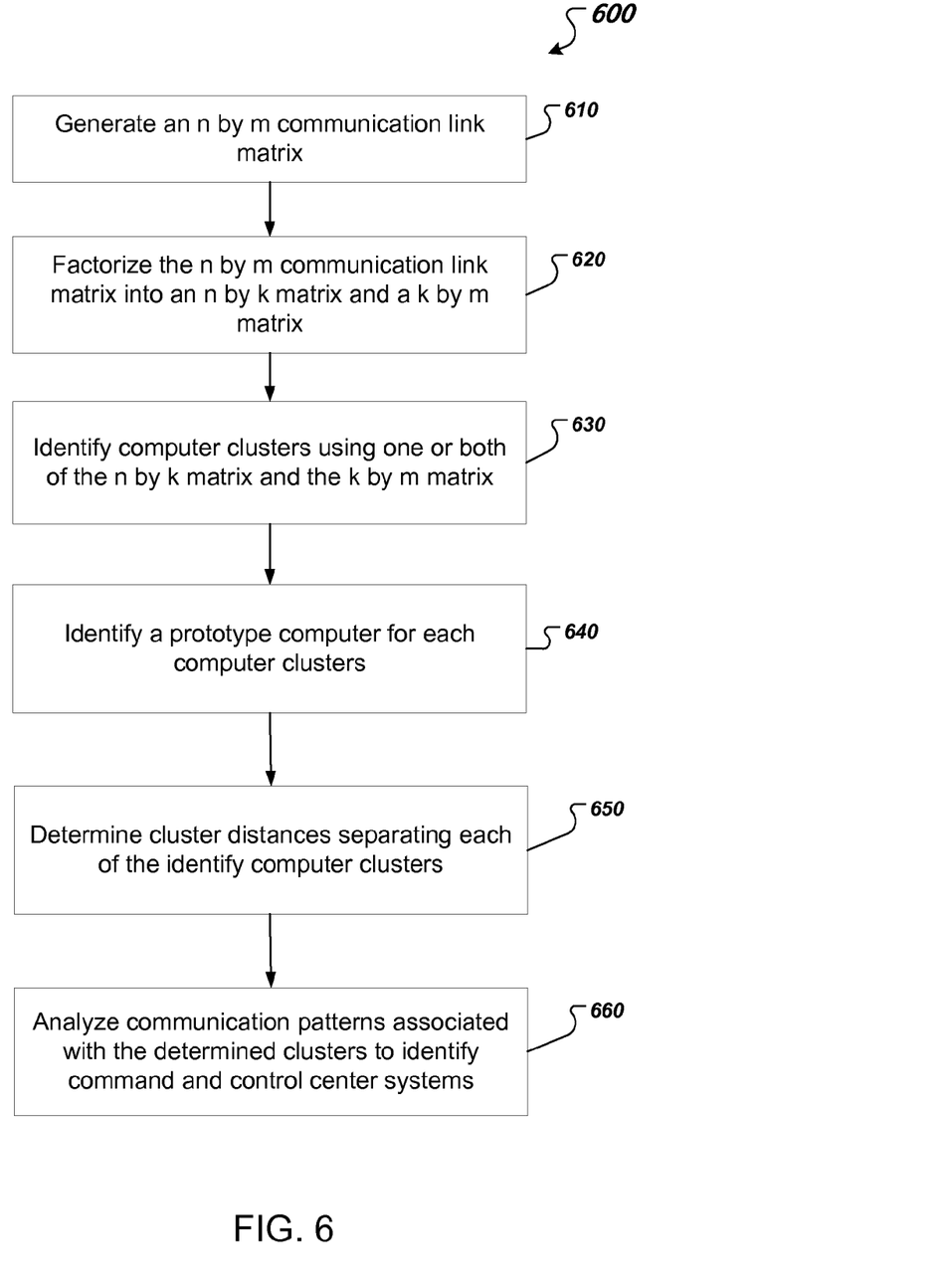
FIG. 6 is a flowchart illustrating an example process for identifying command and control center systems.

FIG. 6 is a flowchart illustrating an example process 600 for identifying command and control center systems. The process 600 can be performed by an example system, e.g., the system 400 of FIG. 4.

The system generates (610) an n by m communication link matrix having n number of rows and m number of columns. Each of the n number of rows can be associated with an internal computer of a computer network and each of the m number of columns can be associated with an external computer that has communicated with at least one of the internal computers during a specified time period. The communication link matrix can include information indicative of communications between the internal and external computers. For example, each matrix element can have a first value, e.g. "1", to indicate that the internal computer associated with the row of that element and the external computer associated with the column of that element communicated during the specified time period. Otherwise, the element can have a second value, e.g. "0", to indicate that no communications between the internal computer associated with the row of that element and the external computer associated with the column of that element occurred during the specified time period. In some implementations, the communication link matrix elements can have values that are indicative of an amount of data traffic the occurred between internal computers and external computers.

The system factorizes (620) the n by m communication link matrix into an n by k matrix and a k by m matrix, the n by k matrix having n number of rows and k number of columns and the k by m matrix having k number of rows and m number of columns. For example, the system can factorize the 6 by 4 communication matrix 210 of FIG. 3A into the 6 by 2 first component matrix 302 and the 2 by 4 second component matrix 304. The n by m communication link matrix can be factorized using one of a number of factorization techniques, such as the factorization techniques previously described.

The system identifies (630) computer clusters using one or both of the n by k matrix and the k by m matrix. For example, the n by k matrix can represent a condensed version of communication link profile information for each of the internal computers with each row of the n by k matrix being associated with one of the internal computers. The system can group internal computers that are associated with rows in the n by k matrix having identical or similar element values into computer clusters. In some implementations, the system can map data points associated with each of the internal computers onto a k-dimensional coordinate space, where each data point represents a row of the n by k matrix. The system can cluster the data points based on distances between the data points within the k-dimensional coordinate space, with data points that are closest to each other being clustered together. In some implementations, the system defines clusters by a threshold distance, wherein the minimum radius required to encircle all data points within each cluster is equal to or less than the threshold distance.

The system can use the k by m matrix to identify computer clusters for the external computers in which each external computer is represented by a data point mapped into a k-dimensional coordinate space. The system can associate each column of the k by m matrix with an external computer and subsequently map each column onto the k-dimensional coordinate space. The system can then group the mapped data points into clusters as described above.

The system identifies (640) a prototype computer for each computer cluster. The prototype computer is a computer having a data point that is representative of all data points associated with computers within a cluster that includes the prototype computer. In some implementations, the system determines the prototype computer by drawing a radius from the center of each data point within a cluster such that the radius of each data point encircles all other data points of the cluster. The system identifies the computer associated with the data point having the smallest radius as the prototype computer. In some implementations, the system identifies the prototype computer by determining a sum of the total distances between each data point and all other data points in a cluster. The system identifies the prototype computer as the computer associated with the data point having a shortest total distance between itself and all other data points of the cluster.

The system identifies (650) distances separating each of the identified computer clusters. In some implementations, the system identifies the distance between two clusters as the distance between the prototype data points of each cluster. In some implementations, such as minimax linkage clustering implementations, the system identifies the distance between two clusters as the smallest radius that can encompass all points of two clusters. Other techniques for determining a distance between two clusters can also be used, such as, for example, complete linkage clustering or centroid linkage clustering. In some implementations, once the system identifies distances between clusters, the system implements an iterative process to create larger clusters from smaller clusters by grouping clusters that are closest in distance to each other. The system can form larger clusters from smaller clusters in an iterative process until clusters having a desired number of data points (or a number of data points within a desired range) are identified. In some implementations, the system forms larger clusters from smaller clusters in an iterative process until a maximum cluster radius threshold is reached for each identified cluster.

The system analyzes (660) communication patterns associated with the determined clusters to identify command and control center systems. For example, the system can flag clusters having a small number of internal computers in communication with a number of external computers when compared to other clusters to identify "fast flux" behavior.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
receiving data traffic information on communications between a set of internal computers with a set of external computers, wherein the set of internal computers are located within a network, and the set of external computers are outside the network;
parsing the received data traffic information to identify communication links between the internal computers and the external computers, each communication link comprising an act by an internal computer to communicate with an external computer or an act by an external computer to communicate with an internal computer;
determining a communication link profile for each of the internal computers using the identified communication links;
grouping the internal computers into a plurality of computer clusters based on similarities in communication link profiles for each internal computer, wherein computers having communication link profiles that reach a threshold level of similarity are grouped into a same cluster;
identifying a particular internal computer that is located within the network but is not a part of the set of internal computers;
identifying communication links between the particular internal computer and one or more of the external computers;
determining a communication link profile for the particular internal computer using the identified communication links between the particular internal computer and the one or more of the external computers; and
assigning the particular internal computer to a first computer cluster of the plurality of computer clusters based on the communication link profile for the particular internal computer having a threshold level of similarity to communication link profiles of internal computers in the first computer cluster.

2. The method of claim 1, further comprising:
identifying a second computer cluster as including internal computers having communication link profiles indicative of a malware attack based on a shared property of the communication link profiles of the internal computers in the second computer cluster.

3. The method of claim 2, further comprising:
in response to identifying the second computer cluster as including internal computers having communication link profile patterns indicative of a malware attack, identifying one or more external computers from the set of external computers that are in communication with the internal computers from the first computer cluster as command and control center computers supporting the malware attack;
storing identifiers of the identified command and control center computers on a list of identified command and control center computers; and
restricting communications between the internal computers and the identified command and control center computers.

4. The method of claim 1, wherein determining a communication link profile for each of the internal computers includes generating an n by m communication matrix, wherein the n by m communication matrix includes n number of rows and m number of columns, the n by m communication matrix indicates communications between the internal computers and the external computers, and each row of the n rows of the n by m communication matrix is associated with an internal computer and each column of the m columns in the n by m communication matrix is associated with an external computer.

5. The method of claim 4, wherein identifying a communication link profile for each of the internal computers further includes factorizing the n by m communication matrix into an n by k matrix having n number of rows and k number of columns and a k by m matrix having k number of rows and m number of columns, wherein k is an integer smaller than n.

6. The method of claim 1, wherein grouping the internal computers into a plurality of computer clusters based on similarities in communication link profiles for each internal computer includes identifying that each internal computer in a particular computer cluster communicated with a same number of external computers during a specified time period.

7. A non-transitory storage device storing instructions operable to cause one or more computers to perform operations comprising:
    receiving data traffic information on communications between a set of internal computers with a set of external computers, wherein the set of internal computers are located within a network, and the set of external computers are outside the network;
    parsing the received data traffic information to identify communication links between the internal computers and the external computers, each communication link comprising an act by an internal computer to communicate with an external computer or an act by an external computer to communicate with an internal computer;
    determining a communication link profile for each of the internal computers using the identified communication links;
    grouping the internal computers into a plurality of computer clusters based on similarities in communication link profiles for each internal computer, wherein computers having communication link profiles that reach a threshold level of similarity are grouped into a same cluster;
    identifying a particular internal computer that is located within the network but is not a part of the set of internal computers;
    identifying communication links between the particular internal computer and one or more of the external computers;
    determining a communication link profile for the particular internal computer using the identified communication links between the particular internal computer and the one or more of the external computers; and
    assigning the particular internal computer to a first computer cluster of the plurality of computer clusters based on the communication link profile for the particular internal computer having a threshold level of similarity to communication link profiles of internal computers in the first computer cluster.

8. The non-transitory storage device of claim 7, the operations further comprising:
    identifying a second computer cluster as including internal computers having communication link profiles indicative of a malware attack based on a shared property of the communication link profiles of the internal computers in the second computer cluster.

9. The non-transitory storage device of claim 8, the operations further comprising:
    in response to identifying the second computer cluster as including internal computers having communication link profile patterns indicative of a malware attack, identifying one or more external computers from the set of external computers that are in communication with the internal computers from the first computer cluster as command and control center computers supporting the malware attack;
    storing identifiers of the identified command and control center computers on a list of identified command and control center computers; and
    restricting communications between the internal computers and the identified command and control center computers.

10. The non-transitory storage device of claim 7, wherein grouping the internal computers into a plurality of computer clusters based on similarities in communication link profiles for each internal computer includes grouping the internal computers into the plurality of computer clusters such that each computer cluster comprises a subset of internal computers communicating with a set of external computers at a frequency that is different from a frequency of communication between other internal computers and other external computers.

11. The non-transitory storage device of claim 7, wherein determining a communication link profile for each of the internal computers includes generating an n by m communication matrix, wherein the n by m communication matrix includes n number of rows and m number of columns, the n by m communication matrix indicates communications between the internal computers and the external computers, and each row of the n rows of the n by m communication matrix is associated with an internal computer and each column of the m columns in the n by m communication matrix is associated with an external computer.

12. The non-transitory storage device of claim 11, wherein identifying a communication link profile for each of the internal computers further includes factorizing the n by m communication matrix into an n by k matrix having n number of rows and k number of columns and a k by m matrix having k number of rows and m number of columns, wherein k is an integer smaller than n.

13. The non-transitory storage device of claim 12, wherein grouping the internal computers into computer clusters includes identifying rows in the n by k matrix that have a number of elements having identical element values, and determining that the number of elements exceeds a predetermined threshold.

14. The non-transitory storage device of claim 11, wherein the n by m communication matrix is a binary matrix having multiple elements, each element of which having one of a first value or a second value, the first value indicating that an internal computer represented by a corresponding row of the element communicated with an external computer represented by a corresponding column of the element in a pre-specified time period, the second value indicating that an internal computer represented by a corresponding row of the element did not communicate with an external computer represented by a corresponding column of the element in a pre-specified time period.

15. The non-transitory storage device of claim 7, the operations further comprising:
    mapping the communication link profiles for the internal computers in the set of internal computers onto a coordinate space;
    identifying the computer clusters within the coordinate space;
    determining distances between each of the computer clusters within the coordinate space;

calculating, for each computer cluster, an average coordinate space distance between the computer cluster and other computer clusters; and determining that the average coordinate space distance between a second computer cluster and the other computer clusters is greater than a threshold coordinate space distance value.

16. The non-transitory storage device of claim 7, the operations further comprising, prior to grouping the internal computers into computer clusters based on similarities in communication link profiles for each internal computer, organizing data points representing each of the internal computers into a K-D tree data structure using the determined communication link profiles.

17. The non-transitory storage device of claim 7, wherein grouping the internal computers into a plurality of computer clusters based on similarities in communication link profiles for each internal computer includes identifying that each internal computer in a particular computer cluster communicated with a same number of external computers during a specified time period.

18. The non-transitory storage device of claim 7, wherein grouping the internal computers into a plurality of computer clusters based on similarities in communication link profiles for each internal computer includes identifying that each internal computer in a particular computer cluster communicated with a same number of external computers during a specified time period.

19. A system comprising:
one or more computers; and
a non-transitory storage device storing instructions operable to cause the one or more computers to perform operations comprising:
receiving data traffic information on communications between a set of internal computers with a set of external computers, wherein the set of internal computers are located within a network, and the set of external computers are outside the network;
parsing the received data traffic information to identify communication links between the internal computers and the external computers, each communication link comprising an act by an internal computer to communicate with an external computer or an act by an external computer to communicate with an internal computer;
determining a communication link profile for each of the internal computers using the identified communication links;
grouping the internal computers into a plurality of computer clusters based on similarities in communication link profiles for each internal computer, wherein computers having communication link profiles that reach a threshold level of similarity are grouped into a same cluster;
identifying a particular internal computer that is located within the network but is not a part of the set of internal computers;
identifying communication links between the particular internal computer and one or more of the external computers;
determining a communication link profile for the particular internal computer using the identified communication links between the particular internal computer and the one or more of the external computers; and
assigning the particular internal computer to a first computer cluster of the plurality of computer clusters based on the communication link profile for the particular internal computer having a threshold level of similarity to communication link profiles of internal computers in the first computer cluster.

20. The system of claim 19, the operations further comprising:
identifying a second computer cluster as including internal computers having communication link profiles indicative of a malware attack based on a shared property of the communication link profiles of the internal computers in the second computer cluster.

21. The system of claim 19, wherein grouping the internal computers into a plurality of computer clusters based on similarities in communication link profiles for each internal computer includes identifying that each internal computer in a particular computer cluster communicated with a same number of external computers during a specified time period.

* * * * *